Dec. 15, 1925.  1,565,964
K. SCHULZ
PISTON VALVE
Filed May 29, 1924    2 Sheets-Sheet 1

Inventor:
Karl Schulz
by Wm. H. Babcock & Son
Attorneys

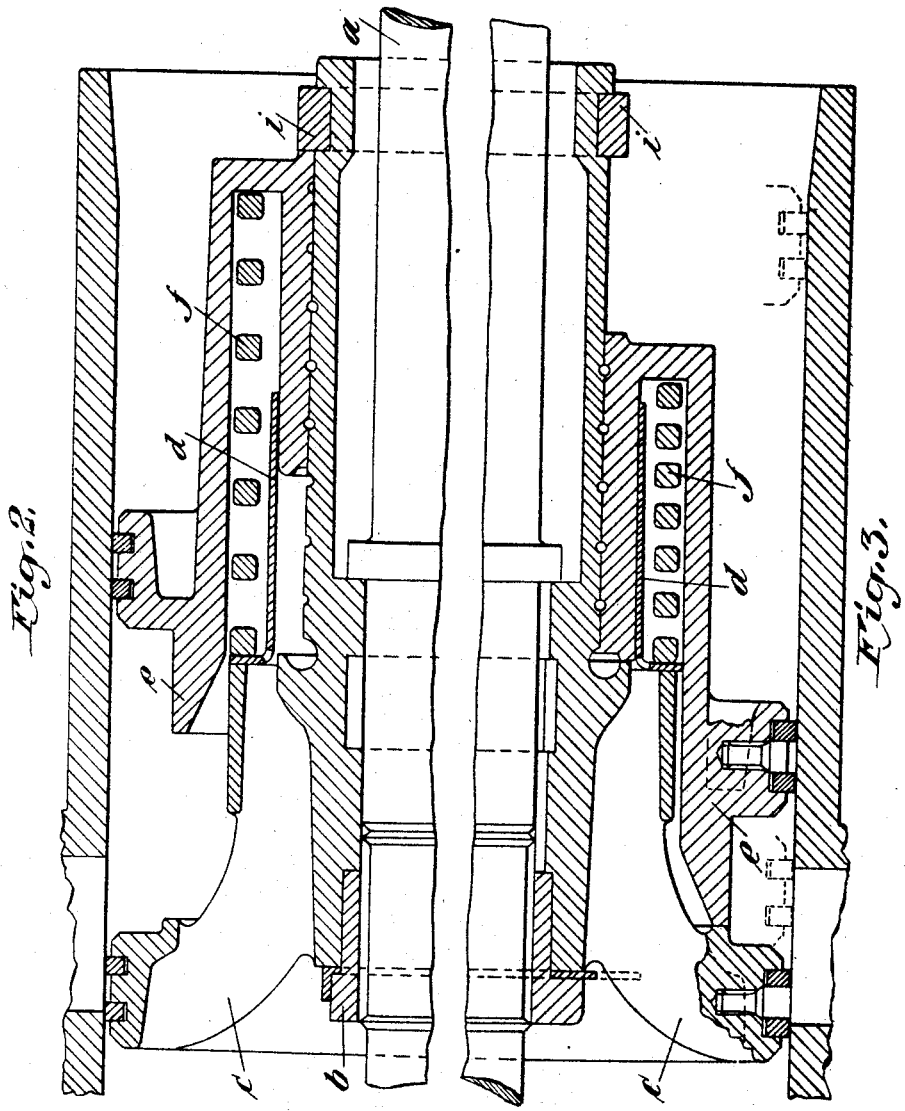

Patented Dec. 15, 1925.

1,565,964

UNITED STATES PATENT OFFICE.

KARL SCHULZ, OF KONIGSBERG, GERMANY, ASSIGNOR TO UNION-GIESSEREI, OF CONTIENEN, NEAR KONIGSBERG, PRUSSIA, GERMANY.

PISTON VALVE.

Application filed May 29, 1924. Serial No. 716,706.

*To all whom it may concern:*

Be it known that I, KARL SCHULZ, a citizen of the Republic of Germany, residing at Konigsberg, Germany, and State of Prussia, have invented certain new and useful Improvements in Piston Valves, of which the following is a specification.

This invention has reference to pressure compensating piston valves, and in particular to a piston valve having two spaced valve bodies, each valve body comprising a piston-like section rigidly secured to the valve rod and a movable section slidably mounted upon the tubular shaft of the stationary section, both sections being held normally in contact to operate as one valve, whilst at the cutting off of the steam the movable sections are displaced relatively to the other sections rigidly secured to the valve rod. The stationary sections are provided with passages by which communication is established between the discharge space and the cylinder spaces on both sides of the steam-piston, as soon as the movable sections are displaced to the stationary sections.

The displacement of the said movable sections is preferably assisted by spring action or the like. A stop fixed upon each stationary section limits the displacement of the appertaining movable section in such a manner that communication of the steam inlet chamber with the discharge space is prevented at any position of the piston valve.

The invention will be more fully described with reference to the accompanying drawing, showing by way of exemplification an embodiment of the principle of the novel pressure compensating piston valve according to this invention.

In the drawings Figure 1 is a longitudinal section through the valve casing of the pressure compensating piston valve in the position during the idle movement of the locomotive engine or the like. Opposite to the section taken through the steam cylinder the section taken through the piston valve is represented as being swung upwards through 90 degrees.

Fig. 2 is a longitudinal section through the stationary section of the left-hand valve body with the upper half of the appertaining movable section in displaced position.

Fig. 3 is a longitudinal section through the same stationary section with the lower half of the appertaining movable section; both sections being shown in normal contact.

Figure 1:
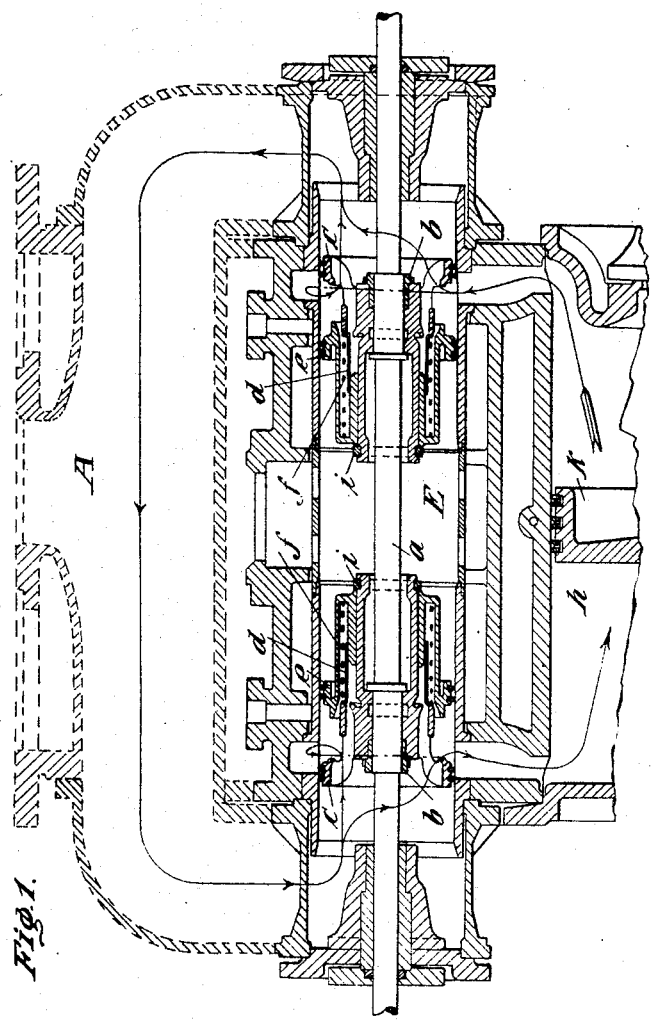

Upon the valve rod $a$ there is mounted the valve section $c$ which may be screw threadedly secured thereto by a nut $b$. Upon the hub of the valve section $c$ the axially displaceable valve section $e$ is mounted in which the spring $f$ is seated which is shielded on all sides during the movement by the provision of a sleeve $d$, and is adapted to be cooled by the air of the discharge space.

The mode of operation of the pressure compensating piston valve is substantially as follows:—If upon the opening of the throttle steam is caused to flow from the boiler into the cylinder $h$, the steam pressure which is considerably stronger than the pressure of the spring $f$ causes the sliding piston section $e$ of the valve to be forced against the stationary section $c$, that is to say the entire piston valve body is closed, and it remains in this closed position, as long as the engine operates under steam in all positions. Upon the idle movement of the engine, that is to say, immediately after the cutting off of the steam by the governor with the accompanying cessation of pressure in the steam entrance space E of the cylinder, the force of the spring $f$ produces the immediate opening of the loose, displaceable valve sections $e$ which are moved into engagement with the stop $i$ on the valve rod $a$, and an unrestricted and sufficiently large communicating passage of the spaces in front and at the rear of the piston $k$ is produced through the exhaust space A of the cylinder, as indicated by the arrow-line in the drawing, while at the same time all communication with the steam entrance space E in the cylinder and with the steam admitting pipe remains permanently interrupted. The engine with this arrangement retains its perfectly smooth, uniform and even movement, free from jerks, inasmuch as neither an underpressure nor an over-pressure is produced by the action of the steam piston $k$. Hence, there will be no braking action which on downward grades would result in a loss of speed.

An additional advantage is presented by the elimination of the admission of cold air into the steam admitting spaces, such as the pipe conduit and the steam cylinder which shortly before were under the influence of the high temperature of the superheated steam, so as to eliminate the liability of the formation of fissures and fractures in the cylinder walls, as have been noted heretofore.

Upon the occurrence of exceedingly high pressures in the cylinder space, thus for instance, in consequence of water slaps, the valve will be automatically opened, causing an immediate drop of pressure towards the exhaust side of the cylinder.

By the employment of the piston valve according to this invention it therefore becomes possible to dispense with all pressure equalizers, air aspiration and safety valves with corresponding conduits and connections, resulting in a reduction of the dead space in the cylinders and in a very appreciable saving of costs for supplies and accessories and for the means of operating the engine. The new pressure compensating piston valve may be employed both for engines with interior as well as exterior operating members. Besides, the valve according to this invention may be constructed without the spring $f$, inasmuch as the function of the spring is to open the valves or valve sections immediately after the cutting off of the steam and without producing any over-pressure by the steam piston, thereby establishing an unrestricted communication of the spaces in front and at the rear of the steam piston without delay.

While the invention has been described with particular reference to locomotive engines, it is obvious that it is susceptible of application to other kinds of steam engines as well, and it is to be pointed out that it is capable of modifications and changes to better adapt it to varying conditions of application, and without deviating from the spirit of the invention, as particularly pointed out in the claims hereunto appended.

I claim:—

1. In a steam engine a valve casing communicating with the discharge space at its ends and having an inlet chamber, a piston valve having two spaced valve bodies, each valve body comprising a relatively stationary section provided with a tubular shaft fixed upon the valve-stem and a movable section slidably mounted upon the tubular shaft of the stationary section, both sections being held normally in contact to operate as one valve, the said stationary section having passages establishing communication between the discharge space and the cylinder spaces on both sides of the steam-piston at the cutting off of the steam, and a stop fixed upon the tubular shaft of the stationary section limiting the displacement of the movable section and thus preventing communication of the inlet chamber with the discharge space at any position of the piston valve.

2. In a steam engine, a valve casing communicating with the discharge space at its ends and having an inlet chamber, a piston valve having two spaced valve bodies, each valve body comprising a relatively stationary section provided with a tubular shaft fixed upon the valve-stem and a movable section slidably mounted upon the tubular shaft of the stationary section, both sections being held normally in contact to operate as one valve, the said stationary section having passages establishing communication between the discharge space and the cylinder spaces on both sides of the steam-piston at the cutting off of the steam, a stop fixed upon the tubular shaft of the stationary section limiting the displacement of the movable section, a ring-shaped housing in the said movable section, and a spring seated in said housing and adapted to assist the displacement of the movable section and to maintain the latter in its displaced position during the cutting off of the steam.

In testimony whereof, I have signed my name to this specification at Konigsberg, Germany this ninth day of May 1924.

KARL SCHULZ.